United States Patent
Goldmann et al.

[11] Patent Number: 5,476,923
[45] Date of Patent: Dec. 19, 1995

[54] DIVALENT COBALT AND MANGANESE SALTS OF 3-CARBOXY-4-(DIHALO-SULFOPHENYLAZO)-1-PHENYLPYRAZOL-5-ONES

[75] Inventors: Jürgen Goldmann, Münchenstein; Bansi L. Kaul, Biel-Benken, both of Switzerland

[73] Assignee: Sandoz Ltd., Basel, Switzerland

[21] Appl. No.: 221,431

[22] Filed: Mar. 31, 1994

Related U.S. Application Data

[63] Continuation of Ser. No. 675,217, Mar. 26, 1991, abandoned, which is a continuation of Ser. No. 41,894, Apr. 23, 1987, abandoned.

[30] Foreign Application Priority Data

Apr. 28, 1986 [DE] Germany ............... 36 14 378.2

[51] Int. Cl.⁶ .............. C09B 29/46; D06P 1/44; D06P 1/46
[52] U.S. Cl. .......... 534/712; 534/785; 523/161; 524/86; 524/106; 8/437; 8/506; 8/508; 8/513; 8/514; 8/519; 8/919
[58] Field of Search ............... 534/712, 785; 523/161; 524/86, 190, 106; 8/437, 506, 508, 513, 514, 519, 919

[56] References Cited

U.S. PATENT DOCUMENTS

| | | | |
|---|---|---|---|
| 849,690 | 4/1907 | Laska | 534/785 X |
| 849,739 | 4/1907 | Laska | 534/785 X |
| 2,048,898 | 7/1936 | Straub et al. | 534/712 |
| 2,289,210 | 7/1942 | Reynolds et al. | 534/785 X |
| 3,423,393 | 1/1969 | Klein | 534/712 X |
| 4,594,411 | 6/1986 | Henning | 534/784 |

FOREIGN PATENT DOCUMENTS 126405 11/1984 European Pat. Off.
3133404 3/1983 Germany ............... 534/712
874220 8/1961 United Kingdom ............... 534/712

Primary Examiner—Johann Richter
Assistant Examiner—Fiona T. Powers
Attorney, Agent, or Firm—Robert S. Honor; Melvyn M. Kassenoff

[57] ABSTRACT

Compounds of the formula

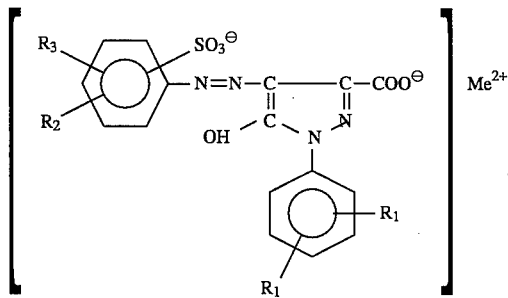

wherein each
$R_1$ is independently hydrogen, halogen, $C_{1-4}$alkyl, $C_{1-4}$alkoxy or nitro,
$R_2$ is hydrogen or halo,
$R_3$ is halo, and
Me is a divalent metal, useful for pigmenting polymeric materials such as polyethylene, polyvinyl chloride, polystyrene, natural rubber and synthetic rubber, for the mass pigmentation of materials such as cellulose acetate and for pigmenting paper, lacquers, paints, printing inks and textile coatings.

14 Claims, No Drawings

DIVALENT COBALT AND MANGANESE SALTS OF 3-CARBOXY-4-(DIHALO-SULFOPHENYLAZO)-1-PHENYLPYRAZOL-5-ONES

This is a continuation of application Ser. No. 07/675,217, filed Mar. 26, 1991, now abandoned, which in turn is a continuation of application Ser. No. 07/041,894, filed Apr. 23, 1987, now abandoned.

The invention relates to new azo pigments, preferably in a polymeric substrate or in lacquer composition.

According to the invention, there is provided a compound of formula I

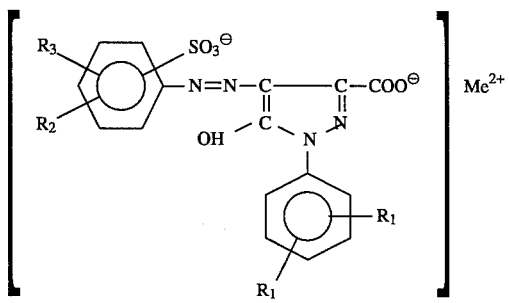

(I)

in which each $R_1$ independently is hydrogen, halogen, $C_{1-4}$alkyl, $C_{1-4}$alkoxy, or nitro;

$R_2$ hydrogen or halogen;

$R_3$ is halogen; and

Me is a divalent metal.

Preferably, the $SO_3^{\ominus}$ group is in an ortho or para position to the azo group, most preferably in the para-position.

Preferably $R_2$ is hydrogen, chlorine or bromine, more preferably hydrogen or chlorine. Preferably $R_3$ is chlorine or bromine, more preferably chlorine.

Preferably $R_1$ is $R_1'$ where $R_1'$ is hydrogen, chloro, bromo, methyl, ethyl, methoxy, ethoxy or nitro; more preferably $R_1$ is $R_1''$ where $R_1''$ is hydrogen, chloro, methyl, methoxy or nitro. Most preferably both groups $R_1$ are hydrogen.

Preferably Me is Me' where Me' is cobalt, calcium, strontium, barium, magnesium or manganese, most preferred being manganese and cobalt.

Compounds of formula I can be prepared by reacting a compound of formula II

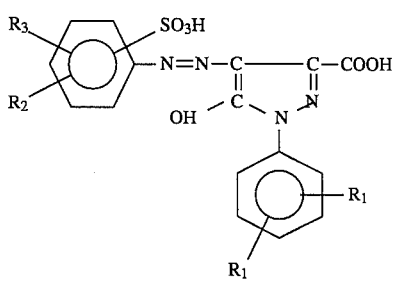

(II)

with a salt of a divalent metal, preferably a Ca-, Sr-, Ba-, Co-, Mg- or Mn-salt (e.g. chloride or sulphate).

Compounds of formula II are known or can be made from known compounds by known methods. The salts of a divalent metal are known or can be made from known compounds by known methods.

The reaction of a compound of formula II with a salt of a divalent metal is preferably carried out in water (as a suspension or solution) preferably at a temperature of 20°–100° C., more preferably at a temperature of 50° to 90° C.

The compounds according to the invention are suitable for pigmenting polymeric materials such as polyethylene, polystyrene, polyvinylchloride, natural rubber and synthetic leather. The compounds according to the invention are also suitable for use in lacquers of various types for example oil or water based paints. The compounds according to the invention are also suitable for pigmenting in the mass (either in solvent containing or solvent free systems) for example spin dyeing of cellulose acetate. The compounds according to the invention are also suitable for printing inks, for pigmenting paper and for applying to coatings of textiles.

The resulting pigmentations have excellent fastness properties to heat, light, weathering, chemicals, migration, bleeding, overlacquering and solvents. Further, the compounds according to the invention maintain their depth of colour and have good application properties, for example resistance to flocculation, resistance to crystallisation and dispersibility.

The invention will now be illustrated by the following Examples in which all parts and percentages are by weight and all temperatures are in °C. unless indicated to the contrary. Any part by volume used corresponds to the equivalent volume of 1 part by weight of water.

EXAMPLE 1

24.2 Parts of 4-amino-2,5-dichlorobenzenesulphonic acid are stirred at 20° to 22° into 30 parts of water and 30 parts by volume of conc. HCl and stirred for 1 hour. The mixture is cooled to 0° to 5° and then 7.1 parts of sodium nitrite dissolved in 21 parts of water are added over 15 minutes maintaining the temperature at 0° to 5°. The mixture is then stirred for 1 hour at about 5° and then excess sodium nitrite is destroyed by the addition of 0.2 parts of aminosulphonic acid.

20.4 Parts of 1-phenylpyrazolone-3-carboxylic acid is dissolved in 100 parts of water and 4.0 parts of sodium hydroxide at 50°. A mixture of 10 parts by volume glacial acetic acid, 40 parts of sodium acetate, 150 parts of water and 150 parts of ice is very slowly added in the form of a fine suspension, the 1-phenylpyrazolone-3-carboxylic acid precipitating out, and the resulting suspension whilst cooling at 0° to 5° is slowly reacted with the diazonium salt suspension.

The resultant orange-coloured suspension is then stirred for a further 4 hours at 0° to 5° and is then stirred at room temperature for a further 2 hours.

A solution of 15.8 parts manganese sulphate in 100 parts water is added very slowly, whilst stirring, to the resultant azo suspension. The mixture is then heated to about 80°, stirred for 2 hours at 80° to 85° filtered hot and the resultant pigment is washed with hot water until the filtrate is chloride free. The resulting presscake is dried and milled. The resultant dye when incorporated into PVC has good fastness properties (e.g. to light).

Instead of using manganese sulphate solution, an equivalent amount of magnesium, calcium, strontium or barium chloride can be used as complexing agent. The resultant pigments have properties similar to those of the manganese complex.

EXAMPLES 2 TO 11

Compounds of the formula

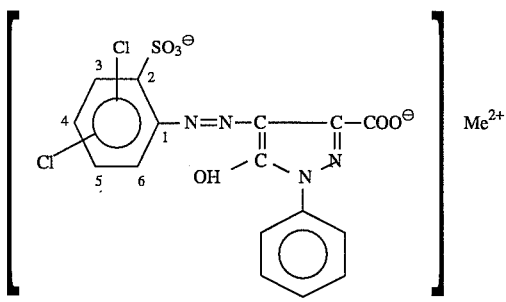

in which the positions of the two chloro atoms and Me are defined in Table 1 below, can be prepared from the appropriate diazo component (for Examples 2 to 6, 2-amino-3,5-dichlorobenzenesulphonic acid and for Examples 7 to 11, 2-amino-4,5-dichlorobenzene sulphonic acid) and 1-phenylpyrazolone-3-carboxylic acid followed by complexing with the appropriate metal complexing solution, according to the method of Example 1.

TABLE 1

| Ex. No. | Positions of two Cl atoms | Me |
| --- | --- | --- |
| 2 | 4,6 | Barium |
| 3 | 4,6 | Calcium |
| 4 | 4,6 | Strontium |
| 5 | 4,6 | Magnesium |
| 6 | 4,6 | Manganese |
| 7 | 4,5 | Manganese |
| 8 | 4,5 | Barium |
| 9 | 4,5 | Strontium |
| 10 | 4,5 | Calcium |
| 11 | 4,5 | Magnesium |

The pigments of Examples 1 to 11 colour PVC a yellow nuance.

EXAMPLES 12 TO 21

Compounds of the formula

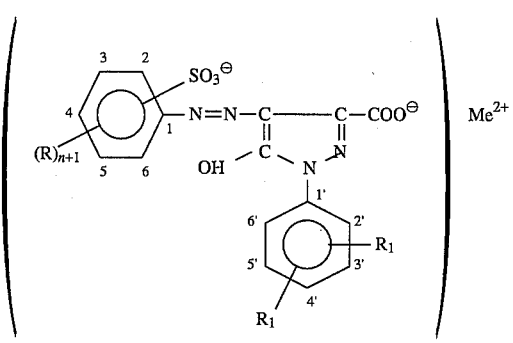

in which Me, R, n and $R_1$ are defined in Table 2 below, as are their positions where appropriate, can be made by a method similar to that for Examples 2 to 11 from appropriate diazo components (for Examples 12 to 14, 4-amino-2,5-dichlorobenzenesulphonic acid and for Examples 15 to 21, 3-amino-4-chlorobenzene sulphonic acid) and coupling components (for Examples 12 and 15 to 18, 1-phenyl-3-carboxy-5-pyrazolone, for Examples 13 and 19, 1-(2',5'-dimethylphenyl)-3-carboxy-5-pyrazolone and for Examples 14, 20 and 21, 1-(2',5'-dichlorophenyl)-3-carboxy-5-pyrazolone) followed by complexing with a metal atom.

TABLE 2

| Ex. No. | Position of $SO_3^-$ | R | n | $R_1$ | Position of $R_1$ | Me |
| --- | --- | --- | --- | --- | --- | --- |
| 12 | 4 | Cl | 1 | 2,5 H | — | Cobalt |
| 13 | 4 | Cl | 1 | 2,5 $CH_3$ | 2',5' | Manganese |
| 14 | 4 | Cl | 1 | 2,5 Cl | 2',5' | Manganese |
| 15 | 5 | Cl | 0 | 2 H | — | Manganese |
| 16 | 5 | Cl | 0 | 2 H | — | Strontium |
| 17 | 5 | Cl | 0 | 2 H | — | Barium |
| 18 | 5 | Cl | 0 | 2 H | — | Cobalt |
| 19 | 5 | Cl | 0 | 2 $CH_3$ | 2',5' | Manganese |
| 20 | 5 | Cl | 0 | 2 Cl | 2',5' | Manganese |
| 21 | 5 | Cl | 0 | 2 Cl | 2',5' | Cobalt |

Pigments of Examples 12 to 21 colour PVC a yellow nuance.

Application Example A 0.05 Parts of the manganese complex of Example 1 are homogenised in a mixing roller mill at 150–160° for about 8 minutes, with 2 parts of dibutyl-tin-bis-thioglycollic acid hexyl ester and 50 parts of a mixture consisting of 65% polyvinylchloride and 35% diethylhexylphthalate.

The polymer is rolled into a sheet and then is glossed in a double roller calender. The resultant transparent sheet has good light fastness properties.

Application Example B

Four parts of the manganese complex of Example 1 are added to 96 parts of a mixture of:

50 parts of a 60% solution of coco aldehyde-melamine resin of 32% of fat content in xylene,
30 parts of a 50% melamine resin solution in butanol,
10 parts of ethylene glycol monoethylether and
10 parts of xylene, and the mixture ground for 24 hours in a ball mill. The dispersion obtained is sprayed on an aluminium sheet, the spray coating allowed to dry in the air for 30 minutes and then stoved for 30 minutes at 120°. A yellow film with good light and weathering fastness is obtained.

In Application Examples A and B, instead of the manganese complex of Example 1 an appropriate amount of any other complex of Example 1 or of Examples 2 to 11 may be used.

What is claimed is:

1. A compound of formula

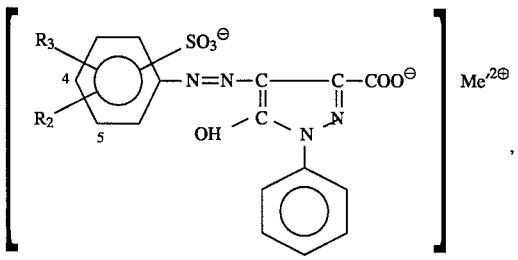

wherein

R$_2$ is halo,

R$_3$ is halo, and

Me' is cobalt or manganese.

2. A compound according to claim 1 wherein R$_3$ is chloro.
3. A compound according to claim 2 wherein R$_2$ is chloro.
4. A compound according to claim 1 wherein the —SO$_3^\ominus$ group is ortho or para to the azo radical
5. A compound according to claim 4 wherein the —SO$_3^\ominus$ group is para to the azo radical.
6. A compound according to claim 4 wherein R$_2$ is chloro, and R$_3$ is chloro.

7. A compound according to claim, 6 wherein the —SO$_3^\ominus$ group is para to the azo radical.
8. A compound according to claim 7 wherein R$_2$ is 2-chloro, and R$_3$ is 5-chloro.

9. The compound according to claim 8 wherein Me' is manganese.
10. The compound according to claim 8 wherein Me' is cobalt.
11. The compound according to claim 6 wherein R$_2$ is 4-chloro, R$_3$ is 6-chloro, Me' is manganese, and the —SO$_3^\ominus$ group is in the 2-position.

12. The compound according to claim 6 wherein

R$_2$ is 4-chloro,

R$_3$ is 5-chloro,

Me' is manganese, and the —SO$_3^\ominus$ group is in the 2-position.

13. A substrate into which a compound according to claim 1 has been incorporated, said substrate being polyethylene, polystyrene, polyvinyl chloride, natural rubber, synthetic leather, cellulose acetate, paper, a lacquer, a printing ink or a textile coating.

14. A process for pigmenting a substrate comprising incorporating into a substrate a compound according to claim 1, said substrate being polyethylene, polystyrene, polyvinyl chloride, natural rubber, synthetic leather, cellulose acetate, paper, a lacquer, a printing ink or textile coating.

* * * * *